United States Patent [19]

Scata

[11] Patent Number: 5,101,983
[45] Date of Patent: Apr. 7, 1992

[54] DEVICE FOR IDENTIFYING AND SORTING OBJECTS

[75] Inventor: Mario Scata, Teramo, Italy

[73] Assignee: Meccanizzazione Postale E. Automazione S.p.A., Teramo, Italy

[21] Appl. No.: 627,679

[22] Filed: Dec. 14, 1990

[30] Foreign Application Priority Data

Dec. 15, 1989 [IT] Italy .................. 22711 A/89

[51] Int. Cl.$^5$ .................. B07C 5/36; B65G 19/02; B65G 19/22; B65G 47/48
[52] U.S. Cl. .................. 209/583; 198/370; 198/733; 198/734; 209/698; 209/917
[58] Field of Search .................. 209/3.1, 3.3, 539, 552, 209/583, 584, 563–566, 606, 698, 900, 912, 917, 924, 925, 933, 934; 198/370, 718, 721, 725, 728, 733, 734

[56] References Cited

U.S. PATENT DOCUMENTS

| 460,202 | 9/1891 | Eberhardt | 198/734 X |
| 869,350 | 10/1907 | Cowley | 198/370 |
| 2,308,729 | 1/1943 | Walter | 209/698 X |
| 2,872,017 | 2/1959 | Anderson et al. | 198/370 X |
| 2,937,739 | 5/1960 | Levy | 209/917 X |
| 3,212,623 | 10/1965 | Griffith | 198/370 X |
| 3,333,675 | 8/1967 | Lord | 198/370 |
| 3,743,090 | 7/1973 | Brown et al. | 209/583 X |
| 4,446,962 | 5/1984 | Burkhardt | 209/917 X |

FOREIGN PATENT DOCUMENTS

| 0899174 | 12/1953 | Fed. Rep. of Germany | 198/733 |
| 3604806 | 8/1987 | Fed. Rep. of Germany | 209/583 |

Primary Examiner—Michael S. Huppert
Assistant Examiner—Edward M. Wacyra
Attorney, Agent, or Firm—Christie, Parker & Hale

[57] ABSTRACT

A device for identifying and sorting objects includes a low-friction surface for supporting parcels to be identified and sorted, each provided with a bar code on at least one side thereof, a dragging mechanism capable of conveying parcels from a staging area to a sorting area via a readout station which identifies each parcel by means of its bar code, and a plurality of trap doors, responsive to the readout station and located at predetermined positions on the low-friction surface, through which the identified parcels are selectively discharged and thereby routed to a corresponding plurality of intermediate or final destinations. The dragging mechanism comprises a pair of pulleys between which a flexible cable is operatively engaged which in turn pulls a plurality of drag arms over the low-friction surface.

6 Claims, 2 Drawing Sheets

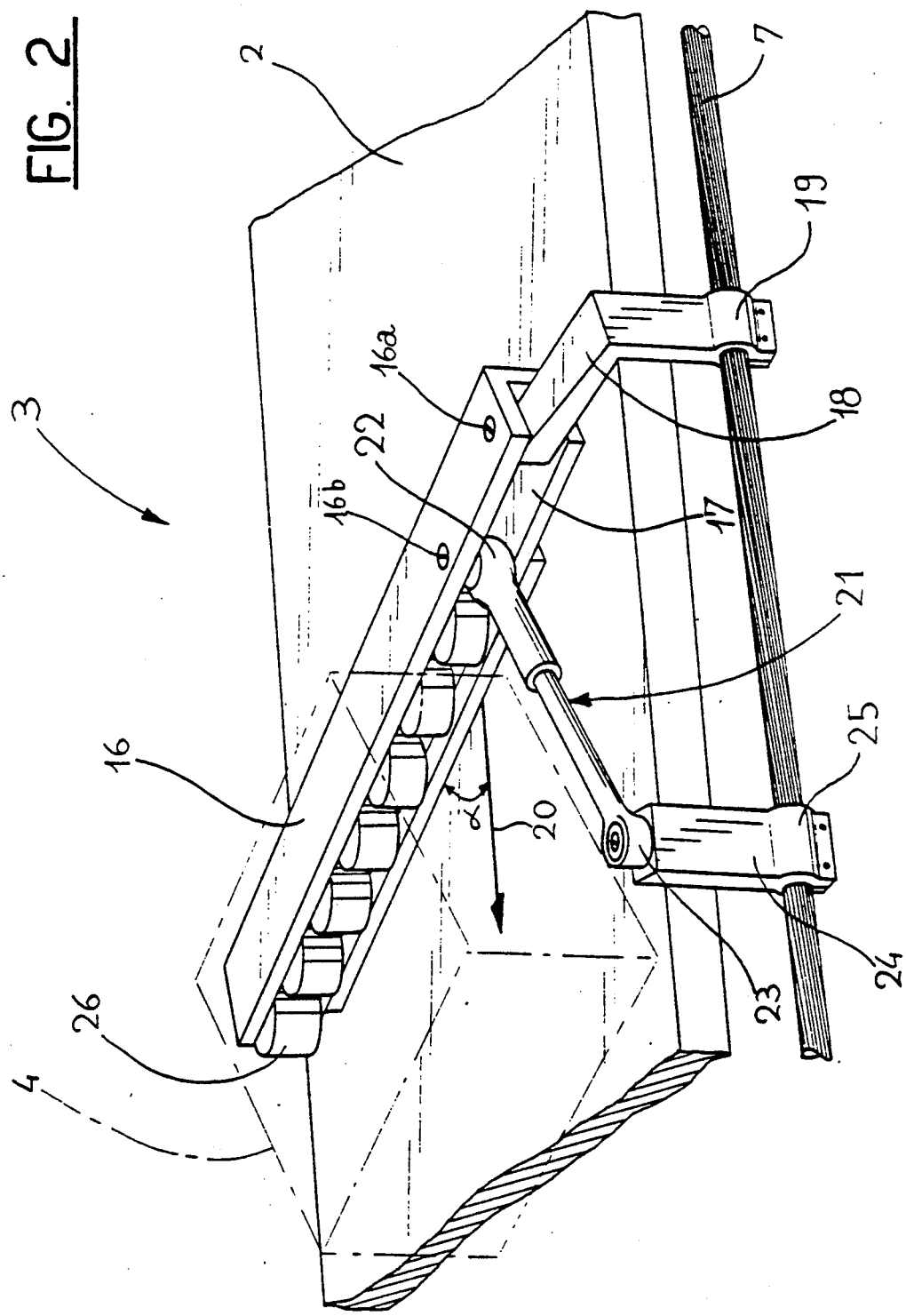

DEVICE FOR IDENTIFYING AND SORTING OBJECTS

FIELD OF THE INVENTION

This invention relates generally to a device for identifying and sorting objects, and more particularly, to a device for identifying the ultimate destination of parcels of varying size and configuration by means of a bar code and then automatically conveying each parcel to an appropriate intermediate destination to facilitate final distribution of the parcels.

BACKGROUND OF THE INVENTION

A known prior art package sorting device includes a bar code reader and a conveying means running in a straight line over a low-friction surface for conveying parcels to a plurality of intermediate destinations. The parcels are classified by means of the bar code reader, and are then routed by dragging each parcel across a plurality of trap doors which, upon command, may be opened to allow the parcels to discharge into respective containers, bags or onto further conveyor belts. The known conveying means consists of substantially quadrangular-shaped openings arranged in a conveyor belt with a diagonal of each opening aligned with the feed direction of the belt itself. The parcels to be sorted come from a feed chute and are dropped into one of the quadrangular openings where, due to the feed motion of the conveyor belt, each parcel is held in a predetermined position defined by the two sides of the quadrangular opening which are opposite the feed direction of the belt and which serve to drag the parcels over the underlying low-friction surface which is disposed under the conveyor belt.

Because devices of the type mentioned above utilize belts running in a straight line over a rectilinear surface, the sorting installations cannot extend over a large distance unless a number of such devices are coupled one to another in an in-line arrangement. Such an in-line arrangement of several conveyor belts poses certain technical problems, especially in the vicinity of the junction or interface between one conveyor belt and the next one in line. In fact, due to the cylindrical shape of the head rollers of the conveyor belts, a gap or trough is present between the two adjacent belts which may cause misalignment of, or even overturn, a parcel, making bar code identification by any downstream readout means impossible. Moreover, connecting several sorting lines by means of in-line coupled belts leads inevitably to difficulties in maintaining the proper synchronization both of the feed motion of the belts relative to one another, and of the opening of each the various trap doors relative to its associated belt. Finally, such in-line sorting devices cannot utilize the conveyor belt during its return trip to the feed chute because the belt is then inverted relative to the low-friction surface.

SUMMARY OF THE INVENTION

A primary object of the present invention is to overcome the drawbacks related to known devices for identifying and sorting objects by providing a device able to use the dragging means to optimally position parcels for bar code identification. A second primary object of the invention is to make efficient use of its various elements by providing an arrangement of low-friction surface and associated dragging means which is also utilized in the return direction. Another object of the invention is to enhance synchronization of the various operating members of the sorting and selecting device.

The present invention provides a device for identifying and sorting objects comprising a low-friction surface for supporting the objects to be sorted (each provided with a bar code applied on at least one side thereof), dragging means running over the low-friction surface to convey the objects from a staging area in the vicinity of a deposit station to a sorting area, a bar code reader for identifying the objects before they reach the sorting area, and a plurality of trap doors extending through the low-friction surface at predetermined positions of the sorting area by means of which the parcels may be selectively discharged for routing to a corresponding plurality of intermediate destinations. The low-friction surface is arranged in the form of a substantially closed-loop. The dragging means comprises a pair of pulleys which engage a flexible transmission member to which is fixed a plurality of drag arms, each running along a closed path defined by the substantially closed-loop low-friction surface.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 2 is a perspective view of a drag member fixed to the flexible transmission member.

DETAILED DESCRIPTION

Figure 1:
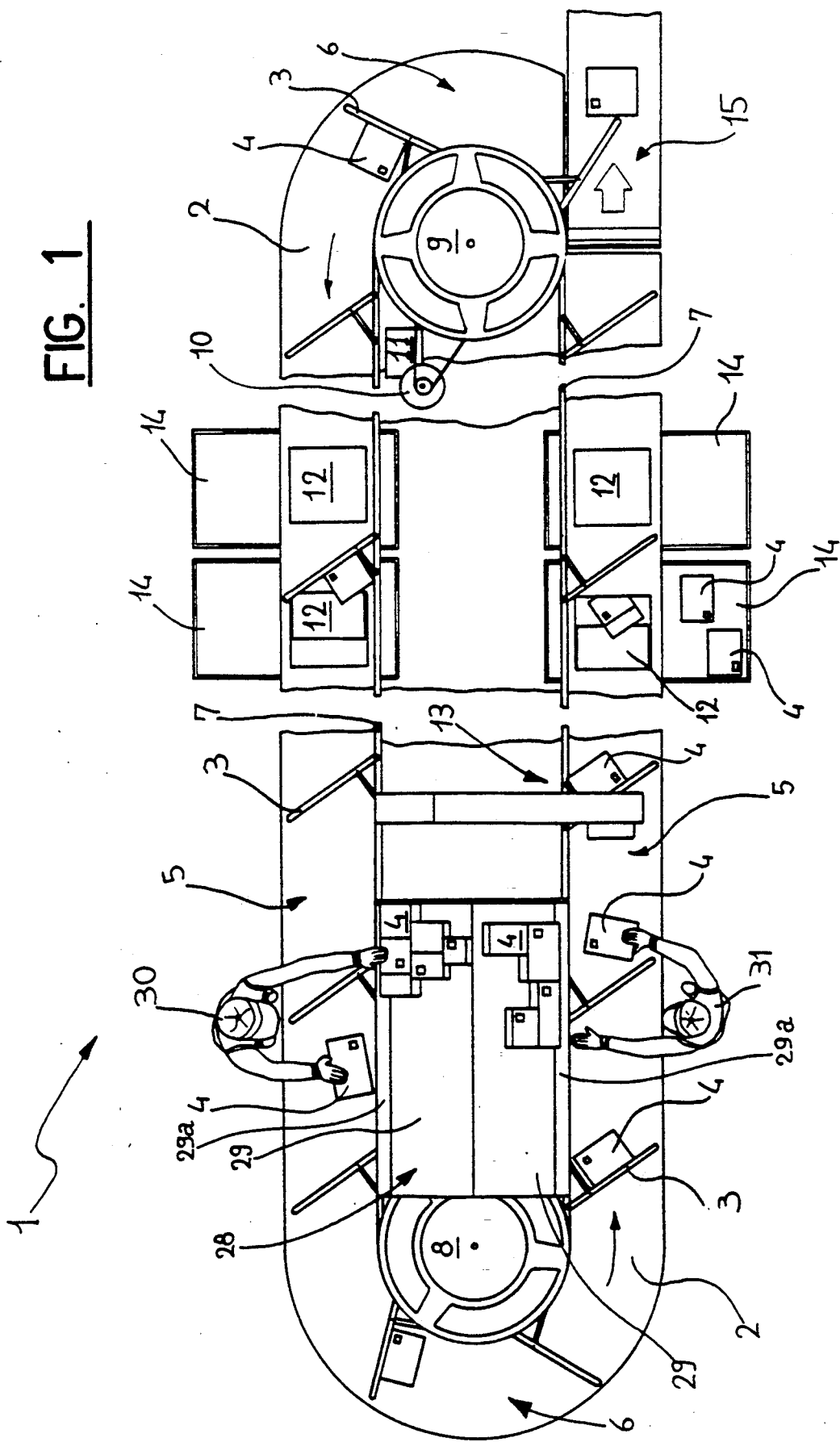
FIG. 1 is a top view of the device during operation.

With reference to FIG. 1, reference numeral 1 generally indicates a device for identifying and sorting objects according to principles of the present invention. The device 1 comprises a horizontal low-friction surface 2 which is fabricated from a material having a low coefficient of friction and is arranged in the form of a substantially closed loop. More particularly, the low-friction surface consists of two parallel rectilinear sections 5, linked at either end by a respective one of two semicircular sections 6.

Over the low-friction surface 2 are disposed a plurality of drag arms 3, spaced apart from one another by a predetermined distance, which run along a closed-loop path over the low-friction surface, and which thereby collectively drag a number of parcels 4 to be identified and sorted. The drag arms 3 are propelled by a transmission cable 7 to which the drag arms are fixed. As illustrated in FIG. 1, the cable 7 is secured to a first (transmission) pulley 8 and to a second (driving) pulley 9, the latter being operated by a motor 10 controlled by an electronic regulator 11.

A conventional bar code reader station 13 for readout and identification of bar codes on the parcels is located in the path along which the parcels 4 are conveyed by the dragging means.

Again, referring to FIG. 1, once various parcels 4 have been identified in transit from the staging area to the sorting area, they are routed by means of a plurality of trap doors 12 which are located downstream from the readout and identification station 13, and which are openable upon a command generated by suitable known means (not shown) contained within readout station 13 itself. Each of the trap doors 12, when opened, allows its associated identified parcels 4 to be selectively discharged into a respective one of a plurality of underlying containers or bags 14, each capable of containing a predetermined quantity of objects with the same intermediate (or final) destination. In an alternative embodiment, the identified parcels 4 may be discharged through the trap doors 12 onto additional conveyor belts (not shown) for routing the parcels 4 toward other collecting areas.

A conveyor belt 15, flush with and linked to low-friction surface 2, is arranged downstream from one rectilinear section 5 of the low-friction surface 2. The belt 15, which is normally stationary, is selectively activated by the readout station 13 to move parcels 4 which have not been identified at readout station 13 away from the sorting area.

A deposit station 28 is located between the two rectilinear sections 5 of the low-friction surface 2, and consists of two respective inclined planes 29 on which parcels to be sorted are placed. The planes 29 are downwardly inclined in the direction of the rectilinear sections 5, and are each provided with a ledge 29a at their lower edge for retaining parcels. Two operator workstations 30, 31 are located facing deposit station 28. Operators at these two workstations manually pick up the parcels 4 and place them on the low-friction surface 2.

With reference to FIG. 2, reference numeral 3 generally indicates a drag arm running on the low-friction surface 2. The drag arm 3 is propelled by, and is securely affixed to, cable 7 which extends along the inner perimeter of, and just sightly below, the horizontal low-friction surface 2. The drag arm 3 comprises a horizontal "C" section 16 having its recessed portion 17 oriented toward the feed direction 20 of the drag arm itself. The horizontal "C" section 16 is linked to cable 7, by means of a bracket 18 having a clamp-shaped end 19 for fastening to cable 7, and an opposite end secured by a pivot 16a to "C" section 16. "C" section 16 is additionally fastened to cable 7 by an adjustable-length link rod 21 having a first end 22 secured by a second pivot 16b to "C" section 16, and an opposite end 23 pivotally attached to a first end of a crank 24, the opposite end 25 of which is clamp-shaped for mounting to cable 7.

Referring again to FIG. 2, since the length of articulated rod 21 may be adjusted, horizontal "C" section 16 makes an angle of variable value α with the feed direction 20 of drag arm 3. It is presently preferred that the angle α be from about 40° to about 80° to allow favorable alignment of parcels 4. "C" section 16 is provided with a plurality of small rollers 26, arranged in parallel along recess 17 and equally spaced from one another by a predetermined distance, with each roller 26 rotating about a respective vertical axis. The small rollers 26 facilitate the sliding of parcels 4 as they are dragged by drag arm 3 over the low-friction surface 2, thereby considerably reducing the friction which would otherwise be generated between the parcels 4 and the horizontal "C" section 16.

The operation of the identifying and sorting device 1 will now be described.

In operation, motor 10 continuously drives the second (driving) pulley 9, thereby propelling cable 7 between and around pulleys 8, 9. Cable 7 in turn causes drag arms 3 to run in a closed loop along the low-friction surface, thereby providing the means to transport each of the parcels 4 during its respective conveyance and sorting cycle.

The conveyance and sorting cycle begins when an operator located at one of the workstations 30, 31 takes a parcel from the deposit area 28 and lays it on the low-friction surface 2 with the bar code facing upward. As each drag arm 3 advances, its "C" section 16 engages the parcel 4 and arranges it with one side abutting the small rollers 26 and a second, adjacent side parallel to the link rod 21. In this way, parcels 4 are correctly oriented to enter readout station 13 with the bar code in position to be read and identified.

Once the parcel has been thus identified, readout station 13 emits a signal for opening a corresponding trap door through which the already identified parcel 4 is discharged and collected in the proper underlying container 14. If any parcel 4 is not identified by readout station 13, either because of failure to read the bar code or a bar code indicating that the parcel is not to be sorted, each trap door 12 remains closed as it is traversed by the parcel, and the parcel is dragged over the low-friction surface 2 until it reaches conveyor belt 15 where it is picked off and routed to other collecting areas.

The present invention thus achieves the objectives of maximizing use of the low-friction surface and the associated dragging means, while still assuring good synchronization among the various operating members of the sorting and selecting device itself.

It will, of course, be realized that various modifications can be made in the design and operation of the present invention without departing from the spirit thereof. Thus, while the principal preferred construction and mode of operation of the invention have been illustrated and described, it should be understood that within the scope of the appended claims, the invention may be practiced otherwise than as specifically illustrated and described.

What is claimed is:

1. A device for identifying and sorting objects, each provided with a bar code applied on at least one side thereof, said device comprising:
   a low-friction surface for supporting the objects to be sorted and defining a staging area and a sorting area, said low-friction surface extending substantially in the form of a closed loop;
   dragging means running over said low-friction surface for conveying the objects along a path defined on said surface from the staging area to the sorting area, said dragging means further comprising
   a pair of pulleys,
   a flexible transmission member extending between and about said pulleys,
   a plurality of drag arms each fixed to said transmission member and adapted to run over said low-friction surface,
   identifying means for reading said bar codes and thereby identifying said objects, and
   a plurality of trap doors responsive to said identifying means and each located at a respective predetermined position on said path.

2. A device according to claim 1, wherein said low-friction surface has two parallel rectilinear sections which are connected at either end by a respective one of two semicircular sections inside each of which a respective one of said pulleys is located, and wherein said path extends along both said rectilinear sections and along at least one of said semicircular sections.

3. A device according to claim 2, further comprising a conveyor belt for removing selected objects from the low-friction surface, said conveyer belt being located downstream from one of said rectilinear sections, with a part of the belt being aligned flush with and forming part of an adjacent semicircular portion of said low-friction surface.

4. A device according to claim 2, further comprising a deposit station for the objects to be sorted disposed between the two rectilinear sections, said deposit station further comprising two planes, each inclined toward a respective rectilinear section of the low-friction surface, and each provided with a ledge for retaining the objects until they are placed on the low-friction surface.

5. A device according to claim 1, wherein each of said drag arms comprises in arm having one end connected to the flexible transmit member and extending outwardly at a predetermined a in the direction of movement of said drag arm.

6. A device according to claim 5 wherein each said arm further comprises a plurality of small rollers, each pivotally mounted about a respective vertical axis and each having an exposed circumferential surface facing the direction of movement of the drag arm.

* * * * *